US005745700A

United States Patent [19]
Caci

[11] Patent Number: 5,745,700
[45] Date of Patent: Apr. 28, 1998

[54] MULTI MEDIA VIDEO MATRIX ADDRESS DECODER

[75] Inventor: Joseph Claude Caci, Owego, N.Y.

[73] Assignee: International Business Machines Corporation, Armonk, N.Y.

[21] Appl. No.: 648,637

[22] Filed: May 13, 1996

[51] Int. Cl.⁶ ................................................. H04N 9/80
[52] U.S. Cl. ..................... 395/200.77; 348/15; 348/19; 348/384
[58] Field of Search ................... 395/200.77, 200.34; 348/15, 19, 384, 394, 395, 400, 401, 402, 403, 441

[56] References Cited

U.S. PATENT DOCUMENTS

| | | | |
|---|---|---|---|
| 4,535,471 | 8/1985 | Kuroda | 381/2 |
| 4,760,460 | 7/1988 | Shimotohno | 358/261 |
| 5,235,421 | 8/1993 | Yang | 358/141 |
| 5,253,053 | 10/1993 | Chu et al. | 358/133 |
| 5,271,071 | 12/1993 | Waite | 382/56 |
| 5,376,968 | 12/1994 | Wu et al. | 348/413 |
| 5,392,223 | 2/1995 | Caci | 364/514 |
| 5,467,136 | 11/1995 | Odaka et al. | 348/416 |
| 5,640,332 | 6/1997 | Baker et al. | 364/514 A |
| 5,668,599 | 9/1997 | Cheney et al. | 348/402 |

Primary Examiner—Emanuel T. Voeltz
Assistant Examiner—Patrick Assouad
Attorney, Agent, or Firm—Richard M. Goldman

[57] ABSTRACT

A video decoder for receiving compressed, weighted, and encoded input video data in matrix form. The video data is produced from the original difference vector of each pel and transmitted as a bitstream including compressed pel data word descriptor. The video decoder reconstitutes the bitstream into matrix format and calculates individual pel values. The decoder includes capability for restoring the original modulo of the pel data word descriptor and restoring the associated address of each pel in the matrix.

10 Claims, 9 Drawing Sheets

TEMPORAL & SPATIAL RELATIONSHIPS

| 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|
| 1 | 0 | 1 | 1 | 0 | 1 | 1 | 1 | 1 | 0 | 1 | 1 | 1 | 1 | 0 | 0 | 1 | 1 | 1 | 0 | 0 | 0 | 0 | 0 |

FULL SIZE PIXEL AT MODULO 24.

| 0 | 0 | 0 | 0 | 0 | 0 | 0 | 0 | 0 | 0 | 0 | 0 | 1 | 1 | 0 | 0 | 1 | 1 | 1 | 0 | 0 | 0 | 0 | 0 |

DIFFERENCE VECTOR AT MODULO 24

| X | X | X | X | X | X | X | X | X | X | X | X | 1 | 1 | 0 | 0 | 1 | 1 | 1 | X | X | X | X | X |

DIFFERENCE VECTOR AT MODULO 7, X = DON'T CARE.

1100111
P/N DIFFERENCE VECTOR AS A P/N SEQUENCE

PIXEL TO DIFFERENCE VECTOR TO P/N SEQUENCE

FIG. 4

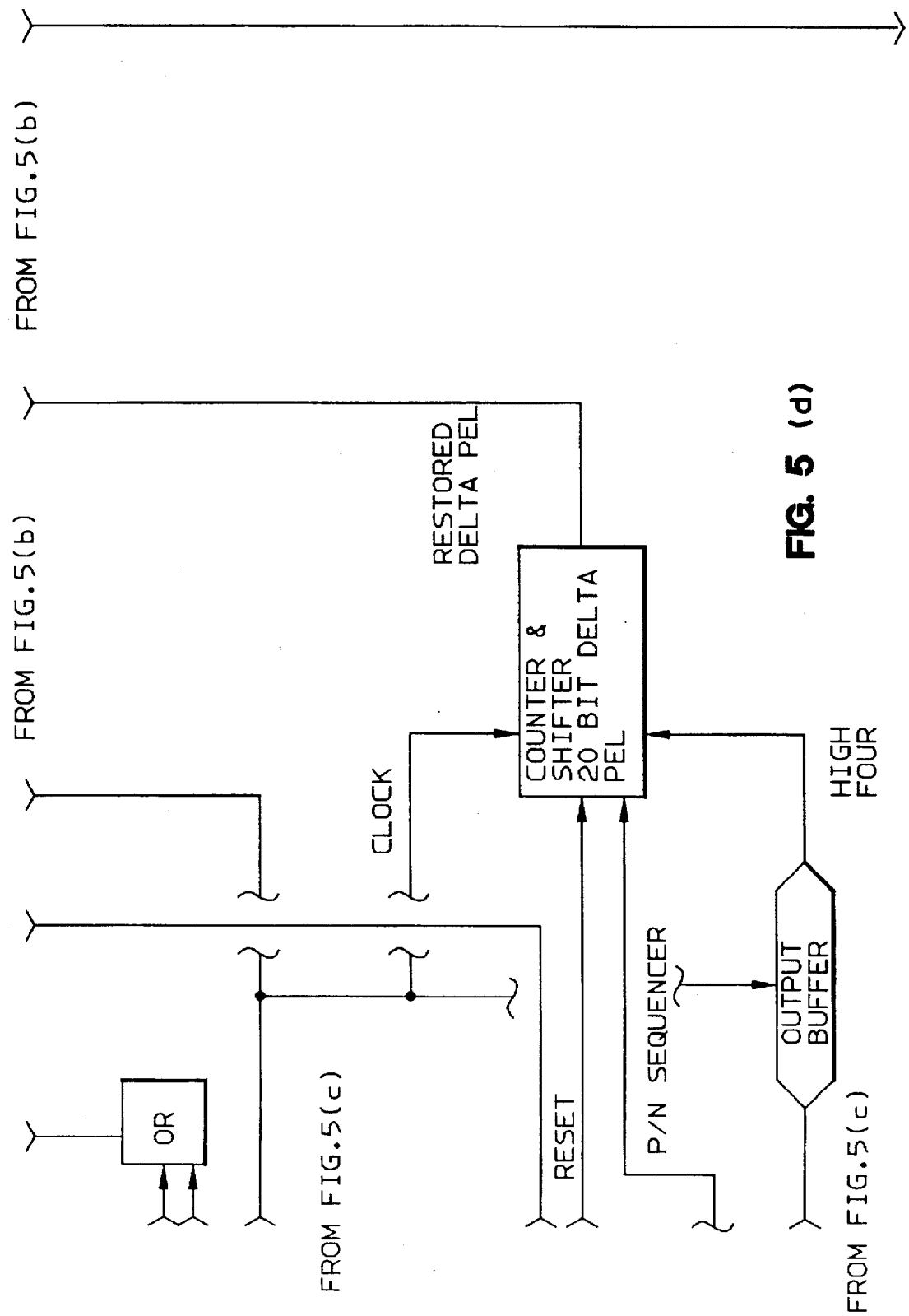

DWD #1 BYTE; LOW FOUR = # OF P/N BITS PER PEL VARIABLE
HIGH FOUR = LOCATION OF PEL VARIABLE MSB
IN RELATION TO 20 BIT PEL MSB

MULTI MEDIA VIDEO MATRIX ADDRESS DECODER

FIELD OF THE INVENTION

The invention relates to multi-media video decoders. By a decoder is meant hardware or software that receives compressed and weighted video data words and outputs the original size video data word. The decoder described herein is especially useful for video teleconferencing.

Each video datum, that is, the video data word describing each pel, has a unique binary address in a video memory map assigned to it. This binary address is identical to the original address assigned to the data word at the transmission point. The originating communications processor (comm processor) formats and compresses the video to meet the constraints of the communications circuit and the requirements of the receiving or decoding communications processor. The address of the pel in the originating frame is not transmitted. The frame is not transmitted as sequentially scanned lines as in NTSC or RGB format. Rather, the frame is broken up into matrices to take full advantage of data reduction and compression algorithms.

A "key plan" is developed by the encoder which contains all the information about the frame that is required to reconstruct the frame at the receiving end. Key plans are prebuilt and part of the comm processor and are described fully in U.S. Pat. No. 5,392,223, incorporated herein by reference. The comm processor uses the key plan to load and initialize the decoder so that the component matrices of the frame can be decoded from the received data.

A video address matrix decoder is provided according to the invention that can restore the original modulo of a number and its associated logical address in a matrix. The address of a pel can be a relative one such as the rank and order of a matrix which is part of a larger matrix or the address can be the complete frame address. The decoder can decode in real time as the data is received. By doing so in real time, the decoder provides the capability for video to be assembled as it is received.

BACKGROUND OF THE INVENTION

Analog video data from an analog camera must be converted to digital data to be displayable on a typical computer screen. The comm processor does much of this work. In the process of digitizing the video data, the comm processor must also format the originating video data into a size and form suitable for transmission over telecommunication networks and/or storage in a RAM or other storage medium.

Video data is stored in video random access memory at a unique address for each pel corresponding to a bit map of the image. Storage in memory requires this address to locate a single datum in a large array. The video random access memory may contain one or more display images. Computer images are painted on the screen quite differently from television analog images. In analog imaging the direct video data, as analog video data, is applied to the CRT. Computer imaging uses an indirect method to generate video. The digital video data comes from a video RAM having color data in a color lookup table. The table contains all the colors possible within the constraints of the computer's video device.

The transmitted video from the originating comm processor is a sequential stream of binary data which can also be described as a P/N (positive/negative) sequence. This data is produced from the original difference vector of each pixel or pel. The comm processor handles compression and weighting separately. The formation of the difference vector is one of several intermediate steps in the construction of compressed and weighted video data. The difference vector is mapped to the same pixel in a corresponding memory map at the decoder end. The key to decoding the data is advanced knowledge of the exact encryption key (modulo base and order of transmission) and certain knowledge of the first bit of the sequence. The comm processor will signal the decoder of the arrival of the first bit of video data. The video data is packed into a channel frame format as described in U.S. Pat. No. 5,392,223. The comm processor breaks out the video data in a Positive/Negative format and directs it to the decoder for reconstitution. The decoder clocks in the first video bit and several following bits to rebuild the difference vector to the full modulo format as originally created. The decoder pads zeros to rebuild the difference vector back to the original modulo.

Consider the following example. If the original video was modulo 18, there would be 18 bit positions per video pixel. At the transmitting comm processor the processor may choose a 6 bit difference processing modulo. The modulo then becomes 6 and only 6 bits are transmitted. However the 6 bits must be located in the Positive/Negative stream and reconstituted back to the 18 bit modulo and in the same relationship to the Most Significant Bit (MSB) as originally generated. The decoder does this and tags the reconstituted difference vector with the correct matrix address given to the vector when the originating comm processor formatted the frame according to the key plan.

Parenthetically, a special digital to analog converter called a RAMDAC chip is used to format the data for application to the CRT. The RAMDAC produces red, blue and green video but not directly from the video data in the video RAM. The RAMDAC has a built in component called a color lookup table stored in very fast memory. Typically this memory has access times of below 5 ns. The color look up table memory is small, for example, about 256 words. The words may be large, for example, 20 to 24 bits per word, with 24 bits per word as a common arrangement. The video RAM which contains the video data is large, for example about 1 to 5 megabytes. This arrangement of video RAM and a color look up table can support a large number of pixels, but the range of colors for each pixel is limited to the size of the color look up table memory. The data in the video RAM is used to index into the color lookup table and point the RAMDAC to the color lookup table value of the voltage that will produce the color. The video RAM contains pointers to the actual colors. The pointers match the size of the color lookup table. If the color lookup table is 256 bytes, then the video RAM pointers should be 8 bits to access all of the colors in the look up table.

The pointer words are not required to be 8 bits, but could be 7 or 6 bits. The purpose of the pointer word is to point to the color in the color lookup table for the specific pixel in the video RAM.

THE FIGURES

The invention may be understood by reference to the FIGURES appended hereto.

FIG. 1 shows the temporal and spatial relationships in a sequence of two video images, frame A (11) and frame B (13), with pixels (0,0) and (1024,1024) numbered. The difference frame (21) shows the difference between frame A (11) and frame B (13), i.e., $\nabla_1 \times \nabla_2$. This is computed as, for example, 0000XXXXXX0000000000, and transmitted as XXXXXX. The difference frame, with value $\nabla_1 \times \nabla_2$, is modified (has added to or subtracted from it) the deviation frame, sigma (31). The frame is then broken up into fields of pixel matrices (41) for transmission.

FIG. 2 shows an example of a video matrix address, the encoding of the video matrix, and the transmission of the Positive/Negative sequence.

FIG. 3 shows nested temporal difference processing as nested circles. The innermost circle (101) symbolizes the difference pixel temporal difference. The first concentric circle (103) represents a weighting process to select a modulo for the data, this is done through the key plan. The second concentric circle (105) symbolizes video compression as input to bandwidth control, with video data in Positive/Negative sequence format.

FIG. 4 shows the pixel to difference vector to positive/negative sequence conversion sequence.

FIGS. 5(a)–(e) show a logic diagram for the matrix address decoder of the invention. Inputs include H-address Max, H valid, V-address Max, V valid, Positive/Negative sequence, co-directional Clock, Data Word Descriptor (DWD), DWD Valid, and Reset. Outputs include the Video Ram 20 bit address, and the 20 bit Delta Pel.

DETAILED DESCRIPTION OF THE INVENTION

A video address matrix decoder is disclosed. The decoder restores the original modulo of a pel data word number and the pels' associated logical address in a matrix. The address can be a relative one such as the rank and order of a matrix which is part of a larger matrix or the complete frame address. The decoder can decode in real time as the data is received. By decoding in real time the decoder provides the capability for the video image to be assembled as it is received.

Compressed and weighted video data received by the decoder is the product of difference processing and other processes in the encoder. Difference processing is both spatial and temporal in nature. The spatial nature is that a single pel address in RAM may be considered a part of a set relative to other pels in a frame, with several sets possible in a frame. Only selected sets are transmitted. The temporal nature is that a pel location in RAM may be considered an accumulator, in that its value changes from frame to frame. Only temporal changes are transmitted.

Figure 1:
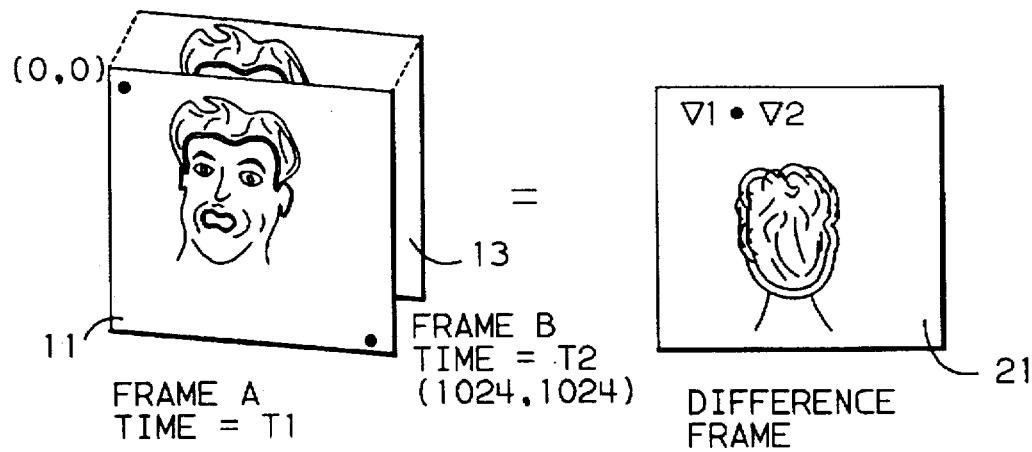
Figure 1:
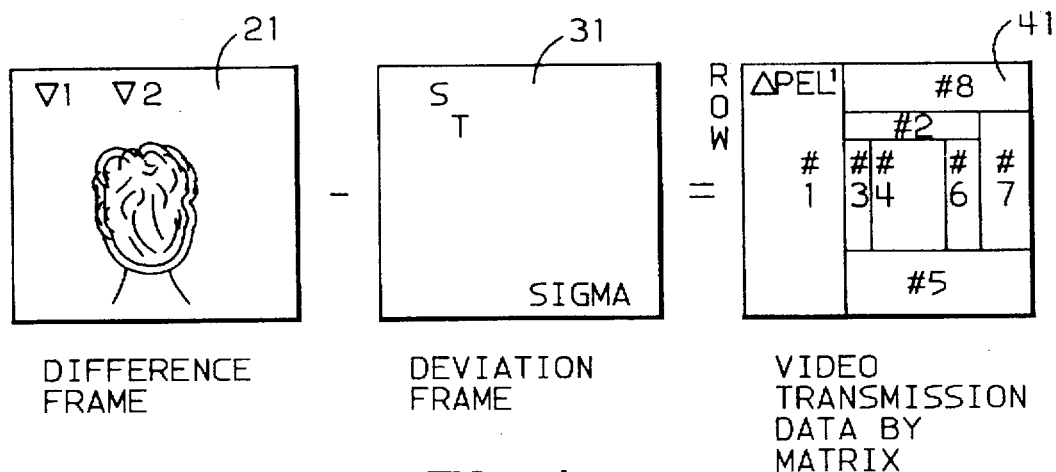

The pel RAM location may be thought of as an accumulator with a unique value at time $T_1$ in frame A. In the absence of video compression, at the same pel in frame B at time $T_2$ the contents of the same pel's RAM location would be updated to a new value. However, as shown in FIG. 1, in the case of video compression, it is the difference between a pel in frame A and the same pel in frame B that is stored, i.e., the difference frame. That difference frame will be substituted in the accumulator and made available for further processing and transmission. Further processing includes subtraction of the deviation frame from the difference frame, as shown in FIG. 1. What is transmitted is the difference frame minus the deviation frame, as shown in FIG. 1.

Because there is little change from frame to frame, most of the difference values, delta, in a set of sequential frames will be equal to 0 or will approach 0. Such small difference values will be considered 0, especially when delta is computed statistically over several frames. There will be several areas in the frame where there will be contiguous non-zero values of delta. These areas may be separated by areas of zero delta. Each of these non-zero areas constitutes a number set.

The frame video RAM address is maintained throughout the processing of the delta values. When the final transmission form of the difference number is completed, a Positive/Negative sequence is generated that represents the address of the sets in the frame video RAM. This is a lengthy sequence as there may be several hundred thousand pels in a frame. The sequence of zeros and ones will be represented by and transmitted as codes. At the receiving end the codes are deciphered and the Positive/Negative sequence restored with clock. This sequence with clock is the input to the Video Address Matrix Decoder. The output of the Video Address Matrix Decoder is a sequential address list with associated Data Word Descriptors.

Figure 2:
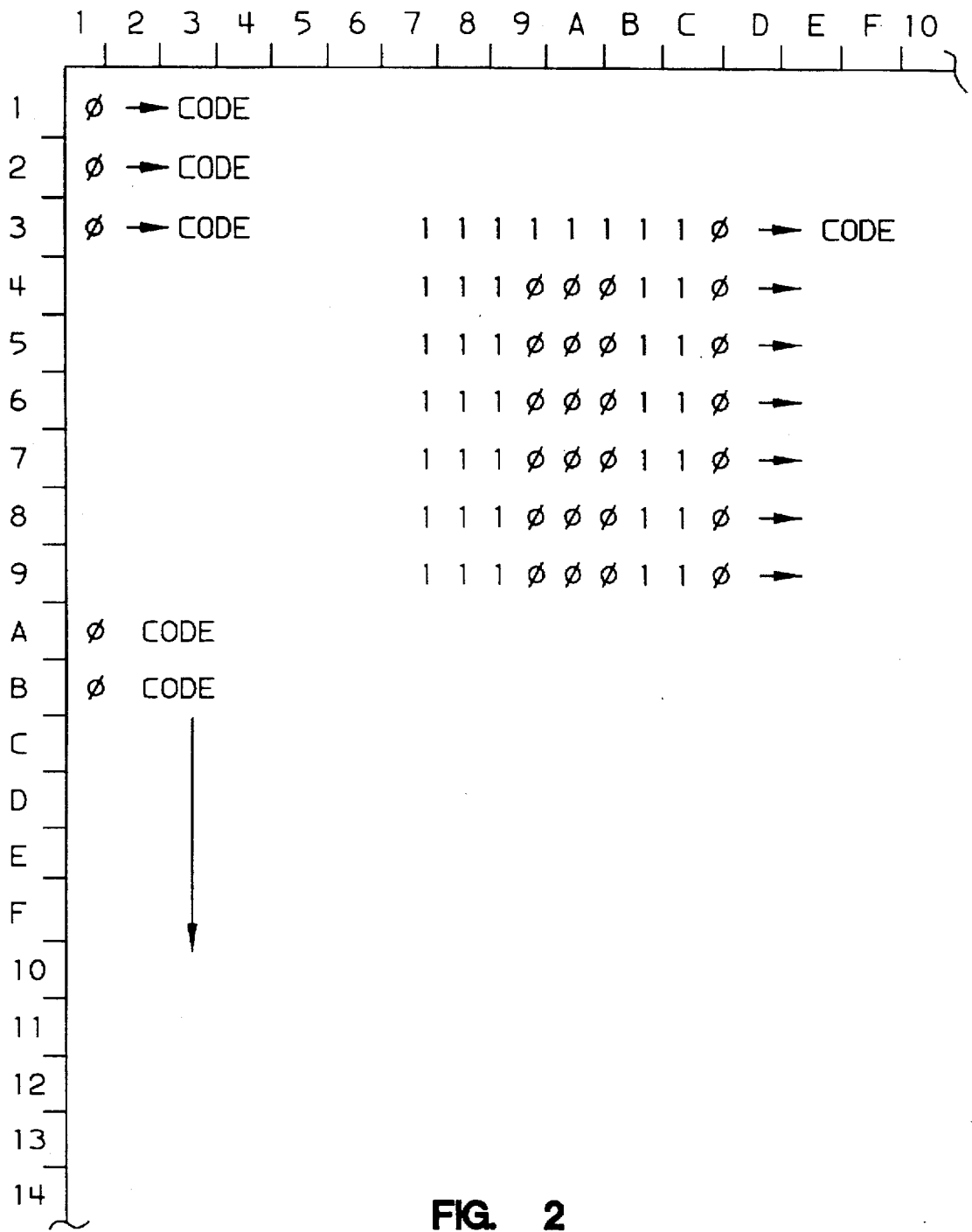

The Positive/Negative sequence is a simple transformation of RAM hexadecimal data. The contents of the RAM cell determine if the cell is represented by a 0 or a 1 as shown in FIG. 2. The initial Positive/Negative sequence is subject to further data compression. Compression codes are transmitted in place of the Positive/Negative sequence. At the receive end the codes are reconstituted into the Positive/Negative sequence with directional clock. The compression codes take only a fraction of the bandwidth of the Positive/Negative sequence, and the Positive/Negative sequence itself takes only a fraction of the sequence of hexadecimal RAM addresses and video data.

There are five input functions used for operation of the Decoder. They are:

H-address max (low word);
V-address max (high word);
Clock (required codirectional data clock);
Initializer Bit (set/reset); and
Data Word Descriptor (DWD).

These functions could also be implemented with a larger set of variables that constitute the same function set.

At the encoding end the Comm Processor maps all of the horizontal pels into the H-address max set. As a line is scanned, a clock is used to divide the scan into discrete units, i.e., Picture elements or pels. These units are sampled and digitized, and become video data or pel data. The number of discrete units varies in the implementation. In workstation implementations, a common number of pels per line is 1024. The comm processor will select a maximum number of horizontal units that the transmission pipeline can accommodate. That number will be H-address max. The Comm Processor then maps all of the horizontal pels into the H-address max set.

V-address max represents the maximum number of horizontal scan lines that the transmission medium can accommodate. The Comm Processor will select a maximum number of vertical scans that the transmission pipeline can accommodate. That number will be V-address Max. The Comm Processor also creates matrices according to a selected key plan and each matrix will have a maximum value for H-address max and V-address max.

The Clock represents the availability and validity of the data, and is also used to time the operation of the processor.

The Positive/Negative Bit sequence represents the video data pels which are transmitted. This variable can be considered a matrix of order H-address max by V-address max.

The initializer bit is the signal to start operation or to stop operation and reset registers to initial values. It signals the beginning of a frame.

The Data Word Descriptor (DWD) is a variable associated with each set. It represents a binary number extracted from a pel in a difference frame. The DWD contains the number of bits extracted and the position of the bits relative to the Most Significant Bit (MSB).

The Data Word Descriptor (DWD) is broken into two variables. In this implementation and for demonstrative purposes it is a byte or 8 bits. The upper 4 bits contain the number which represents the number of bits used to represent the delta value or difference. The lower four bits represent the offset from the Most Significant Bit (MSB) delta pel is to be loaded.

The Decoder has registers to receive and hold these variables. There is a register of the DWD, and the H-address Max and V-address Max. There is a receiver for the Positive/ Negative bit, the clock bit, and the Initializer bit. Initialization of the Decoder is performed prior to operation.

In steady state operation, after receiving a reset signal, the clock transitions and Positive/Negative bit sequences start. The next clock transition causes the H counter to increment. If the H-address Enable signal is true the contents of the H-counter are pushed into the H Low Word buffer; if not, then the H count is incremented and no other actions taken.

When the H-counter increments it is pushed into a comparator and subtracted from H-address Max. On zero, the H-counter is reset to zero, and the V-counter is incremented to the next scan line. The V-counter is likewise subtracted from the V-address Max in the comparator. On zero the V-counter is reset to zero. All of the pels in the matrix will have their addresses counted in this way.

This process continues until a 1 is received on the Positive/Negative sequence with valid clock. This causes H-address enable to go True. H-address enable True causes H-counter to be pushed into the H-low word buffer. The V-count high word is shifted left 10 bit positions in a 20 bit register using the ×10 internal clock. Then the H-low word and the V-high word are summed to make a hexadecimal address and made available for output. The DWD is also made available for output.

Together the Hexadecimal address and the DWD will form the variables needed to receive streaming video data for further processing by the Comm Processor.

Figure 3:
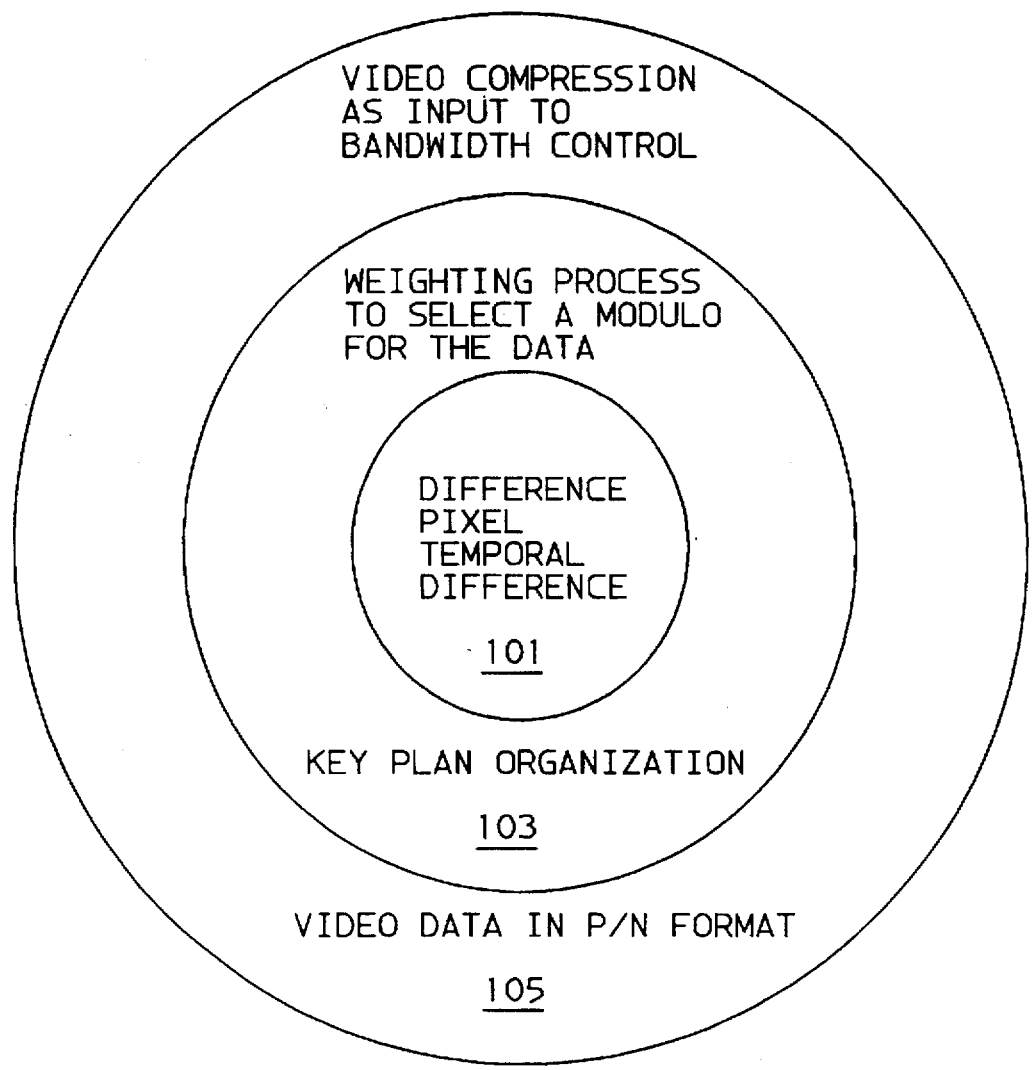
Figure 5A:
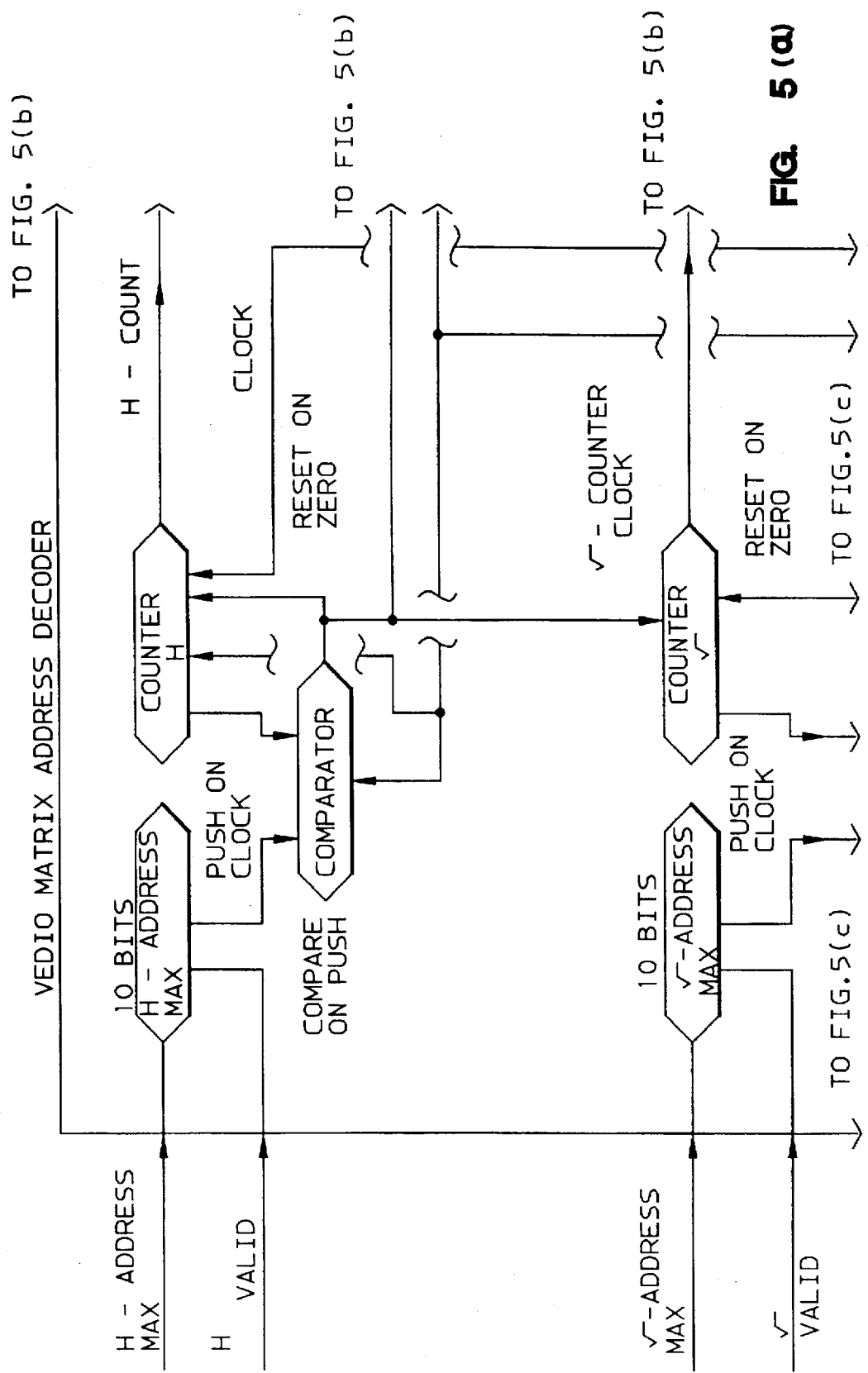
Figure 5:
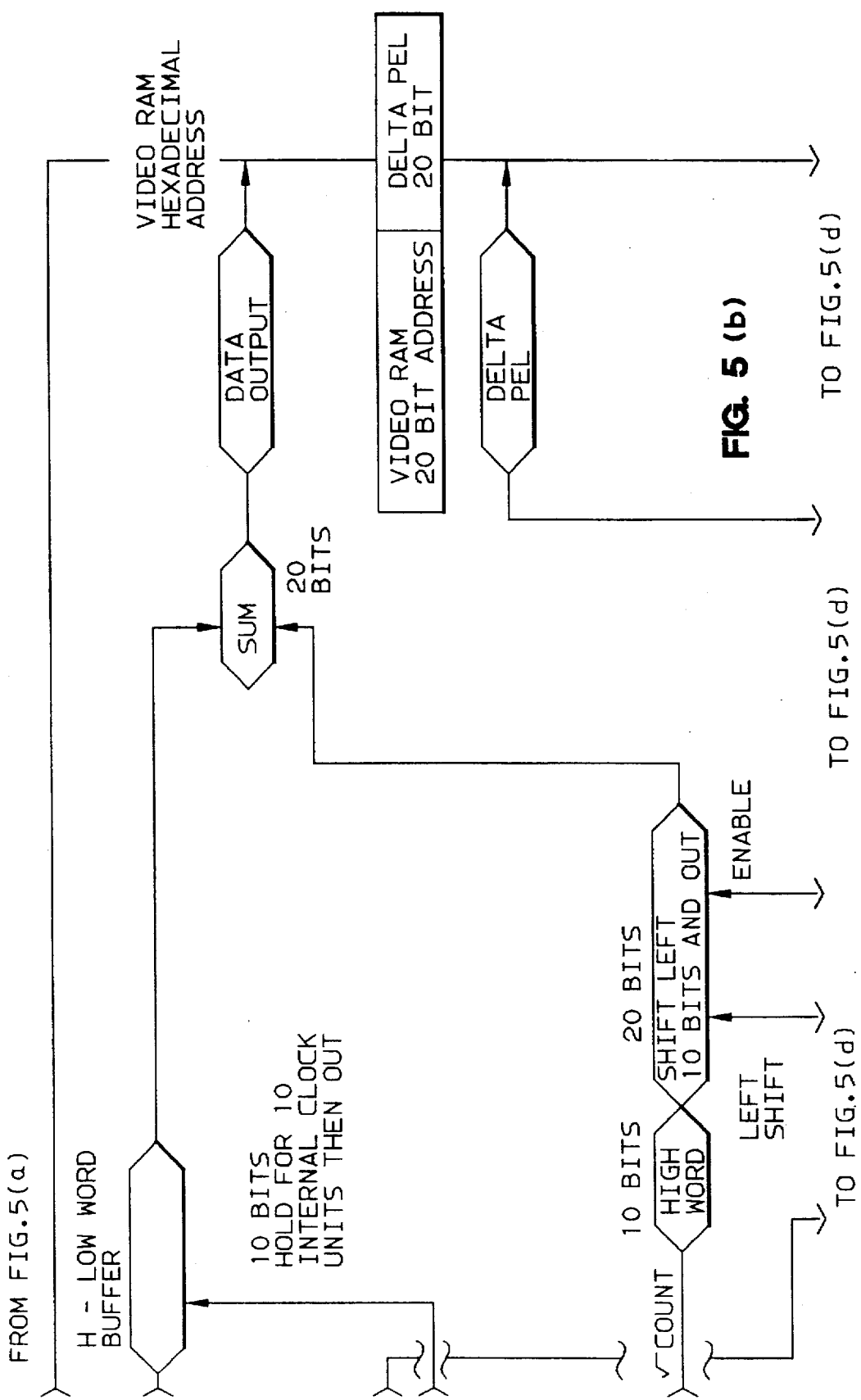
Figure 5:
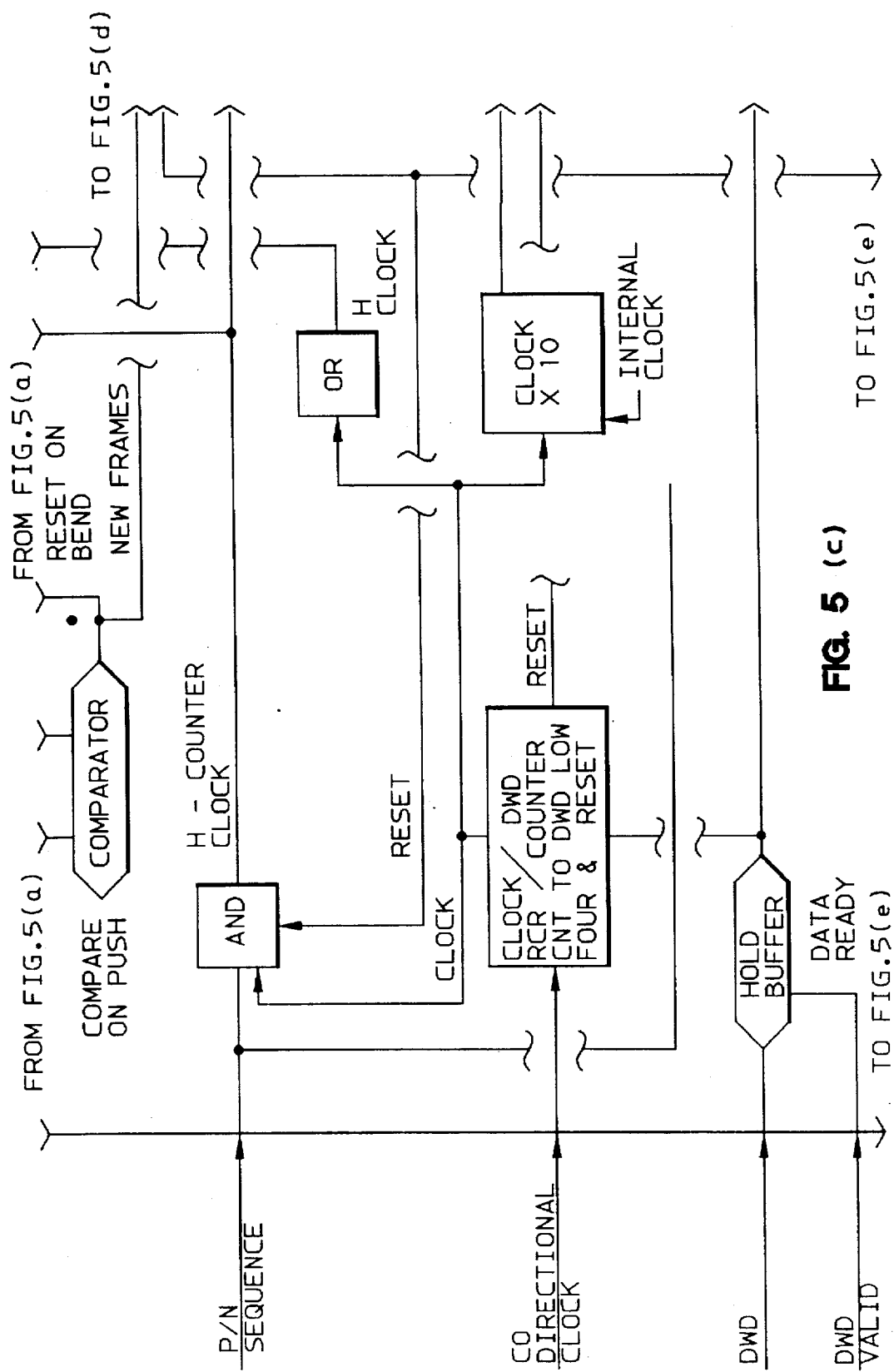
Figure 5E:
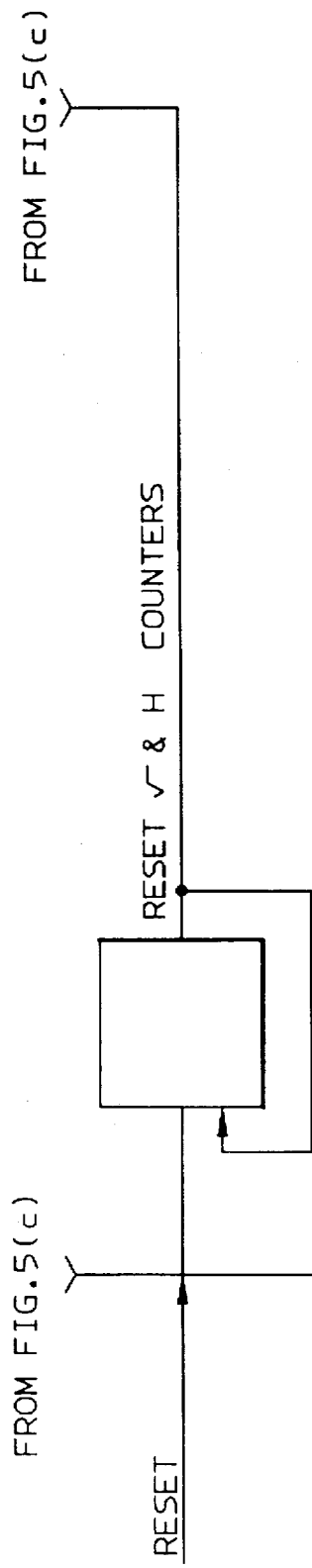

FIG. 3 shows the relationship in a nested process which the comm processor uses to generate video for variable bandwidth transmission in a telecommunications channel. The sliding range compression of U.S. Pat. No. 5,392,223, shown in FIG. 3 thereof, is implemented by adjusting the modulo of the temporal difference pixel, or difference vector. It is a difference vector because it represents the difference of the same pixel at two points in time. It is used to increase or decrease the previously transmitted pixel value to bring it up to date. After restoration and some further processing, it will become the voltage driving the red, blue, or green circuit going into the receiving end CRT. This specific pixel is a member of a matrix of pixels with a specific address in the memory map. The comm processor selects a key plan and creates several matrices representing the video frame. Order of matrix transmission is a component part of the key plan. In the system of the invention members of a matrix have the same properties. One of these properties is a common modulo.

FIG. 1 shows an example of how a video frame may be broken up into several matrices as part of a key plan. The matrices are transmitted over a telecommunications circuit encapsulated in the comm processor's multiplex protocol. They are transmitted without the corresponding address of the video memory map and not in any sequential order. Rather a matrix is chosen for a multiplex protocol time slot based on bandwidth considerations by the comm processor as part of the multiplex protocol. This is another element of the key plan. The receiving comm processor obtains the key plan and the receiving order of the matrices. The key plan is not a constant value but changes to adapt to bandwidth requirements and bandwidth availability. However the difference vector address in the matrix must be established and the Video Matrix Address Decoder performs this function.

FIG. 4 shows the development of the pixel through difference vector to Positive/Negative sequence. In FIG. 4, the right most X's of the difference vector at modulo 24 are set to "don't care" values, but could easily be all zeros. The point being that the comm processor has selected the 7 bit positions shown in the difference vector. A previous key plan may have sent these 5 "don't care" values earlier and current conditions call for 7 bits selected. This was done through dynamic range analysis in the comm processor. All the difference vectors assigned to a matrix share the same properties, one of which is a common modulo. Note that "no difference" is also a valid difference. Therefore the number of bits in the matrix is known ahead of time by the key plan. The offset to the most significant bit or MSB is also a common property and known ahead of time by the key plan. Note that the offset to the MSB may be known two ways. The first way is to count the positions from the left side of FIG. 4, starting at the MSB to the most important bit of the difference vector, and the other way is to count from the right side of FIG. 4 or the LSB to the least important bit of the difference vector. In this example, there are 12 left sided positions to the MSB and 5 right sided positions to the LSB. If we were to chose which direction, it would not make any difference as the outcome is the same. The matrix decoder has the property to restore from both directions. Either way the difference vector will be properly positioned for restoration. The key plan is transmitted prior to the commencement of operation and is part of the channel setup information.

FIGS. 5(a)–(e) show an implementation of the decoder. It is one of several ways the decoder may be implemented. The decoder may be implemented fully in software or in hardware, with hardware being the preferred choice for speed.

The operation of the decoder is as follows. The decoder is loaded by the receiving comm processor with the maximum horizontal, H-address Max, and vertical, V-address Max, address values of the matrix to be received. A clock is supplied to receive the incoming Positive/Negative sequence. The clock phase and frequency should be traceable back to the originating comm processor. The originating comm processor also loads a data word descriptor, or DWD. The DWD is used by the decoder to set the number of bits per difference vector to be counted out of the P/N sequence and the relationship of the MSB to the most important bit of the difference vector. To further clarify, using the example of the difference vector shown in FIG. 3, a modulo 7 difference vector and clock is presented to the decoder. The decoder having been setup to receive a matrix, clocks in the first bit of the Positive/Negative sequence.

Likewise the direction and order of the Positive/Negative sequence is also known and is a variable to the decoder. For this example it is from the most significant bit to the least significant bit. As an example, the most significant bit is the first to arrive. The target register has already been prepared with the proper modulo, and is fully loaded with all zeros. A DWD component contains the information that tells the decoder how many bit positions to skip from the MSB to the required bit location in the register for the most significant bit of the arriving Positive/Negative sequence. Likewise, the second bit in the sequence is loaded in the next position.

This process continues until the condition of seven clocked in bits have been received and placed in their proper position in the full modulo register. Since the register was fully loaded with zeros, both the left and right side of the seven bits have been padded with zeros restoring the full modulo difference vector. The arrival of the seventh bit also satisfies the condition to push the register forward together with the maximum horizontal and vertical address loaded at setup time. The address is decremented accordingly in preparation for the next sequence of seven bits.

Note that the minimum address can be incremented to achieve the same effect. The rank and order of the matrix are used by the decoder to compute the proper address. The rank and order values also tell the decoder how many variables to expect. It is not a requirement for the matrix elements (difference vectors) to be transmitted by row and column or column and row or even diagonal.

The rank and order are the number of rows and the number of columns of the matrix. It is convenient to decrement but not necessary. When the count of the number of matrix elements is satisfied, the matrix is completed and the decoder is ready to be programmed for the arrival of the next matrix. The decoder has a means to detect a reset condition, when for some reason the telecommunications channel has interference and the data is no longer valid. The comm processor has the order and arrangement of all the matrices of the key plan and therefore knows which matrix is in process. The address of each difference vector in the matrix is translated to back to its logical position in the frame. Although it is not shown in FIGS. 5(a)–(e), the decoder can also restore the address of the pixel in the frame. The offset of the receiving matrix to the original frame is also set in the receiving comm processor, having been set by the key plan at channel setup time and can be loaded into the decoder so that the actual frame address may be computed. Instead of starting from a zero horizontal row and zero vertical column address and counting up to H-address max and V-address max, the offset from the first frame pixel to the first pixel in the matrix can be a variable along with rank and order.

The address count is incremented instead of decremented until the full number of rows and columns has been received thus restoring the original frame address. This process can save one step by the comm processor in restoring full logical frame addresses from matrix addresses.

Another consideration in the design of the decoder is the function of shifting data to restore the data back to the original format. Shifting in relation to MSB or LSB is not to be construed as a limit to the type of operation which can be used to restore the full value of the variable. Other operations such as addition or multiplication can also be used. For example in matrix mathematics, if a matrix is multiplied by a scalar variable, then each element of the matrix is multiplied by the scalar.

Let a two by two order matrix of x and y be multiplied by the scalar variable A. If the scalar A is loaded into a variable in the decoder, then as the words are received, they can be multiplied by the scalar A and thus expanded to their original value. This capability is useful if a constant could be factored out of the original data set thus reducing the size of the original data. The compressed data can be transmitted saving bandwidth and restored by the decoder back at the receiving end.

Rates at which the decoder are expected to work are reasonable and well within the limits of the present art. If we consider an ISDN channel as the lowest common denominator for video conferencing bandwidth, then 128,000 bits per second are available for user bandwidth. Let voice occupy 6000 bits per second in full compressed form and assume a 5 percent overhead burden (6400 bps) for managing the channel software frame protocol format. Then 115,600 bps are available for video bandwidth. A reasonable expectation is that the highest difference vector modulo value is 7 bits, but the average difference vector modulo over a frame would be one half this value. Then the 115,600 bits per second bandwidth has the same effect as about 800,000 bits per second. If the benefits of an easily achievable 50% compression efficiency could be realized then the 115,600 video serial stream perceived bandwidth would be greater than 1.2 megabits per second, or almost a T1 rate.

While the invention has been described with respect to certain preferred embodiments and exemplifications, it is not intended to limit the scope of the invention thereby, but solely by the claims appended hereto.

I claim:

1. Video decoder apparatus for receiving compressed, weighted, and encoded input video data in matrix form produced from the original difference vector of each pel and transmitted as a bitstream including compressed pel data word descriptors, comprising means for reconstituting the bitstream into matrix format and calculating individual pel values, said means comprising means for restoring the original modulo of the pel data word descriptor and means for restoring the associated address of each pel in the matrix.

2. The video decoder apparatus of claim 1 wherein the means for restoring the associated address of each pel in the matrix comprises means for restoring the relative address of a pel, said relative address being the rank and order of a matrix that is part of a larger matrix.

3. The video decoder apparatus of claim 1 wherein the means for restoring the associated address of each pel in the matrix comprises means for restoring complete frame address of a pel.

4. The video decoder apparatus of claim 1 wherein the means for restoring the associated address of each pel in the matrix comprises means for restoring a sequential address list with associated data word descriptors.

5. The video decoder apparatus of claim 1 comprising means for shifting, adding, or multiplying data to restore the data back its original format.

6. A method for decoding video addresses produced in matrix form from original difference vectors of pels in a video encoder, transmitted as a bitstream, and received in a decoder as compressed, weighted, and encoded input video data in matrix form and including compressed pel data word descriptors, comprising means for reconstituting the bitstream into matrix format and calculating individual pel values, said method comprising restoring the original modulo of the pel data word descriptor and restoring the associated address of each pel in the matrix.

7. The method of decoding video addresses of claim 6 wherein restoring the associated address of each pel in the matrix comprises restoring the relative address of a pel, said relative address being the rank and order of a matrix that is part of a larger matrix.

8. The method of decoding video addresses of claim 6 wherein restoring the associated address of each pel in the matrix comprises restoring complete frame address of a pel.

9. The method of decoding video addresses of claim 6 wherein restoring the associated address of each pel in the matrix comprises restoring a sequential address list with associated data word descriptors.

10. The method of claim 6 comprising shifting, adding, or multiplying data to restore the data back its original format.

* * * * *